United States Patent [19]

Koegel et al.

[11] Patent Number: 5,152,127
[45] Date of Patent: Oct. 6, 1992

[54] PROCESS AND APPARATUS TO IMPROVE THE PROPERTIES AND VALUE OF FORAGE CROPS

[75] Inventors: Richard G. Koegel; Timothy J. Kraus; Kevin J. Shinners, all of Madison; Richard J. Straub, Brooklyn, all of Wis.

[73] Assignee: The United States of America, as represented by the Secretary of Agriculture, Washington, D.C.

[21] Appl. No.: 718,716

[22] Filed: Jun. 21, 1991

[51] Int. Cl.$^5$ ................ A01D 43/10; A01D 82/00
[52] U.S. Cl. ........................... 56/14.1; 56/16.4; 56/1; 56/DIG. 1
[58] Field of Search ............. 56/16.4, 16.5, 16.6, 56/14.1, DIG. 1, 1

[56] References Cited

U.S. PATENT DOCUMENTS

| | | | |
|---|---|---|---|
| 3,867,808 | 2/1975 | Kidd | 56/14.1 |
| 3,977,165 | 8/1976 | Klinner et al. | 56/16.4 |
| 4,265,076 | 5/1981 | Krutz | 56/14.4 |
| 4,445,313 | 5/1984 | Elliott et al. | 56/16.4 |
| 4,546,599 | 10/1985 | Cicci et al. | 56/16.4 |
| 4,862,681 | 9/1989 | Linde et al. | 56/16.4 |
| 5,033,257 | 7/1991 | Walters | 56/16.4 |

FOREIGN PATENT DOCUMENTS 724101 3/1980 U.S.S.R. .

OTHER PUBLICATIONS

T. J. Kraus et al., "Impact Maceration of Alfalfa," ASAE Paper 901054, Presented at Amer. Soc. Agric. Engrs., Columbus, Ohio (Jun. 1990).

Primary Examiner—Stephen J. Novosad
Attorney, Agent, or Firm—M. Howard Silverstein; Randall E. Deck; John D. Fado

[57] ABSTRACT

An apparatus and method for the treatment of forage material and other agricultural plants by crushing and impact maceration. The apparatus includes a pair of rotatable, generally cylindrical crushing rollers and a rotatable impact rotor having outwardly extending projections such as fins. Forage material is first passed between the crushing rollers where force applied to the rollers flattens the tubular structure of the plant stem, splitting or creating longitudinal cracks and making the plant fiber more compliant and ribbon-like. Additional maceration occurs as the crushed material is next impacted by the impact rotor, resulting in further splitting and separation of the stems into ribbons. The resultant macerated forage material produced may be subsequently pressed into mats for accelerated field drying. The mats could then be harvested by either baling or chopping when the desired moisture content is achieved. Optionally the apparatus may be provided with a mower positioned forwardly of the crushing rollers to mow forage material in the field for feed or transport to the crushing rollers.

11 Claims, 2 Drawing Sheets

PROCESS AND APPARATUS TO IMPROVE THE PROPERTIES AND VALUE OF FORAGE CROPS

BACKGROUND OF THE INVENTION

This invention relates to a process and apparatus for treating forage material and other agricultural plants by crushing and impact maceration. The treated material exhibits both greater drying rates and digestibility than conventionally treated forage material.

The two most conventional and widely used systems for harvesting forage are: a) mowing and conditioning (drying) followed by baling to produce dry hay, and b) mowing and conditioning followed by chopping to produce silage. However, these two methods typically have losses between the cutting stage and the feeding stage that range from 20 to 30%, which can reduce the quality and profitability of the forage [Savoie et al., Transactions of ASAE, vol. 25, no. 3 (1982), pp. 581-585, 591; Koegel et al., Transactions of ASAE, vol. 28, no. 4 (1985), pp. 1047-1051]. These losses can be classified into: a) losses due to overmaturity, b) losses due to plant respiration during drying, c) mechanical losses including loss of high quality leaves during harvest, d) leaching and other losses due to rain during field curing, e) storage and feeding losses, and f) handling and processing losses.

Processes employing maceration of forage materials of lucerne (alfalfa) have previously been found to increase drying rates and digestibility by ruminants. When macerated, pressed forage material was spread in the sun to dry for hay; it was noted that its drying rate was high relative to that of conventional material. Maceration caused the stems to be split into numerous fibrous pieces while mashing or pureeing the leaves and upper stem segments [Shinners et al., Transactions of ASAE, vol. 30, no. 4 (1987), pp. 909-912]. This resulted in a greatly increased specific surface area, a reduced resistance to moisture removal, and a bruised, darkened material with increased absorption of solar energy [Ajibola et al., Transactions of ASAE, vol. 23, no. 5 (1980), pp. 1197-1300].

Pressed forage fiber of lucerne has also been prepared for feeding trials both in the form of dry hay and as silage to be compared to conventionally prepared hay and silage. When the pressed forage and the control, in the form of silage, were fed to milk cows, contrary to expectation no difference in milk production per unit of dry matter was detectable [Lu et al., J. Dairy Sci., vol. 62 (1979), pp. 1399-1407]. Approximately the same results had been reported by other researchers for hay [Connel and Cramp, Proc. Br. Soc. Anim. Prod., vol. 4 (1975), pp. 112-113]. It has been concluded that the process of maceration allowed the fiber fraction of the forage material, with its high cell wall concentration, to be more extensively digested than the control forage. Later experiments, in which macerated and control lucerne were placed in the rumen of a dairy cow in dacron bags to compare the rate and extent of disappearance, demonstrated that mechanical processing of forage crops could lead to increased digestibility of the fiber fraction. Hong et al. [J. Dairy Sci., vol 71 (1988), pp. 1536-1545, and J. Dairy Sci., vol 71 (1988), pp. 1546-1555] carried out in vitro experiments confirming these results.

Silage as well has been successfully made from macerated lucerne. Shinners et al. [Transactions of ASAE (1988), ibid. ] compared the compaction properties of macerated lucerne with chopped lucerne, and found that macerated lucerne attained higher densities. The higher density of macerated lucerne is considered important in reducing the entrapped oxygen at the time the forage is ensiled, and to prevent the infusion of oxygen and undesirable secondary fermentations when the silo is unloaded. Muck et al. [Proc. 11th C.I.G.R., Dublin, Ireland (1989)] compared the ensiling of mat-harvested lucerne with that of conventionally chopped lucerne. The researchers found that the macerated lucerne fermented more quickly, reaching its final pH in half the time required for the conventionally produced lucerne. Wandel et al. [DLG Mitteilungen, 8 (1990)] found similar high rates of fermentation in macerated grass and in grass-lucerne mixtures.

Machines have been proposed which would: a) mow, b) macerate (severely condition) the forage, c) press the macerated material into thin continuous mats, and d) deposit the intact mats onto the field stubble for drying [Shinners et al., Applied Engineering in Agriculture, vol. 4, no. 1 (1988), pp. 13-18]. The mats of macerated forage could then be harvested by either baling or chopping when the appropriate moisture is reached.

Krutz [U.S. Pat. No. 4,265,076 (1981)] disclosed an apparatus for macerating forage products and pressing the treated forage material into mats for enhanced drying. The apparatus included two cylindrical rollers (17 and 18) rotating in opposite directions at different speeds to macerate the forage material passed therebetween. The macerated products are then conveyed rearwardly between a roller/conveyor (28) and roller (27) for mat formation by pressing. The reference also discloses the use of optional, intermediate fluffer brushes (70 and 71, FIG. 3).

Recently, maceration of crops has been accomplished by passing the forage through a multiplicity of nips between knurled cylindrical surfaces with surface speed ratios of approximately 1.3:1.0 [Shinners et al., Proc. 11th C.I.G.R., Dublin, Ireland (1989), and Koegel et al., Applied Engineering in Agriculture, vol. 4, no. 2 (1988), pp. 126-129]. The number of nips has generally varied between 5 and 7 and the clearances between 0.3 mm and 0.5 mm.

In all of these prior art devices, presses have been provided for forming mats from the macerated material. These presses for forming the mats have generally consisted of either: (1) two belts with the macerated forage between them for running between pressure rolls, or (2) a belt and drum arrangement between which the mat is formed with the aid of pressure rolls forcing the belt toward the drum [Shinners et al. (1989), ibid., and Koegel et al. (1988), ibid.]. As the width of the machines increases to realistic farm sizes, however, belts become more expensive and more difficult to manage.

SUMMARY OF THE INVENTION

We have now invented an apparatus and method for the treatment of forage material and other agricultural plants by crushing and impact maceration. The apparatus includes a pair of rotatable, generally cylindrical crushing rollers, and a rotatable impact rotor having outwardly extending projections such as fins. Forage material is first passed between the crushing rollers where force applied to the rollers flattens the tubular structure of the plant stem, splitting or creating longitudinal cracks and making the plant fiber more compliant and ribbon-like. Additional maceration occurs as the crushed material is next impacted by the impact rotor, resulting in further splitting and separation of the stems into ribbons. The resultant macerated forage material produced may be subsequently pressed into mates for field drying. The mats could then be harvested by either baling or chopping when the desired moisture content is achieved. Optionally, the apparatus may be provided with a mower positioned forward of the crushing rollers to mow forage material in the field for feed or transport to the crushing rollers.

In accordance with this discovery, it is a primary object to provide an improved method and apparatus for creating macerated forage material, to speed drying and to improve digestibility and ensilability over conventionally treated forage.

It is a further object of this invention to provide an apparatus for forming mats of macerated forage material.

Yet another objective is to provide an apparatus for macerating forage material which does not require additional crushing rollers or crushing rollers in combination with one or more finned rotors positioned rearward of the above-mentioned impact rotor which are effective for crushing and macerating forage material that has impacted the impact rotor.

Other objectives and advantages of the invention will become readily apparent from the ensuing description.

DETAILED DESCRIPTION OF THE INVENTION

The apparatus of the invention was designed for the treatment of forage material and other agricultural plants by crushing and impact maceration. The product resulting from treatment in accordance with the invention is in the form of macerated material optionally pressed into mats. Without being limited thereto, the apparatus is especially suited to the treatment of forage materials including alfalfa (lucerne), grasses, clover or other plants used for hay, silage, or feed.

Figure 1:
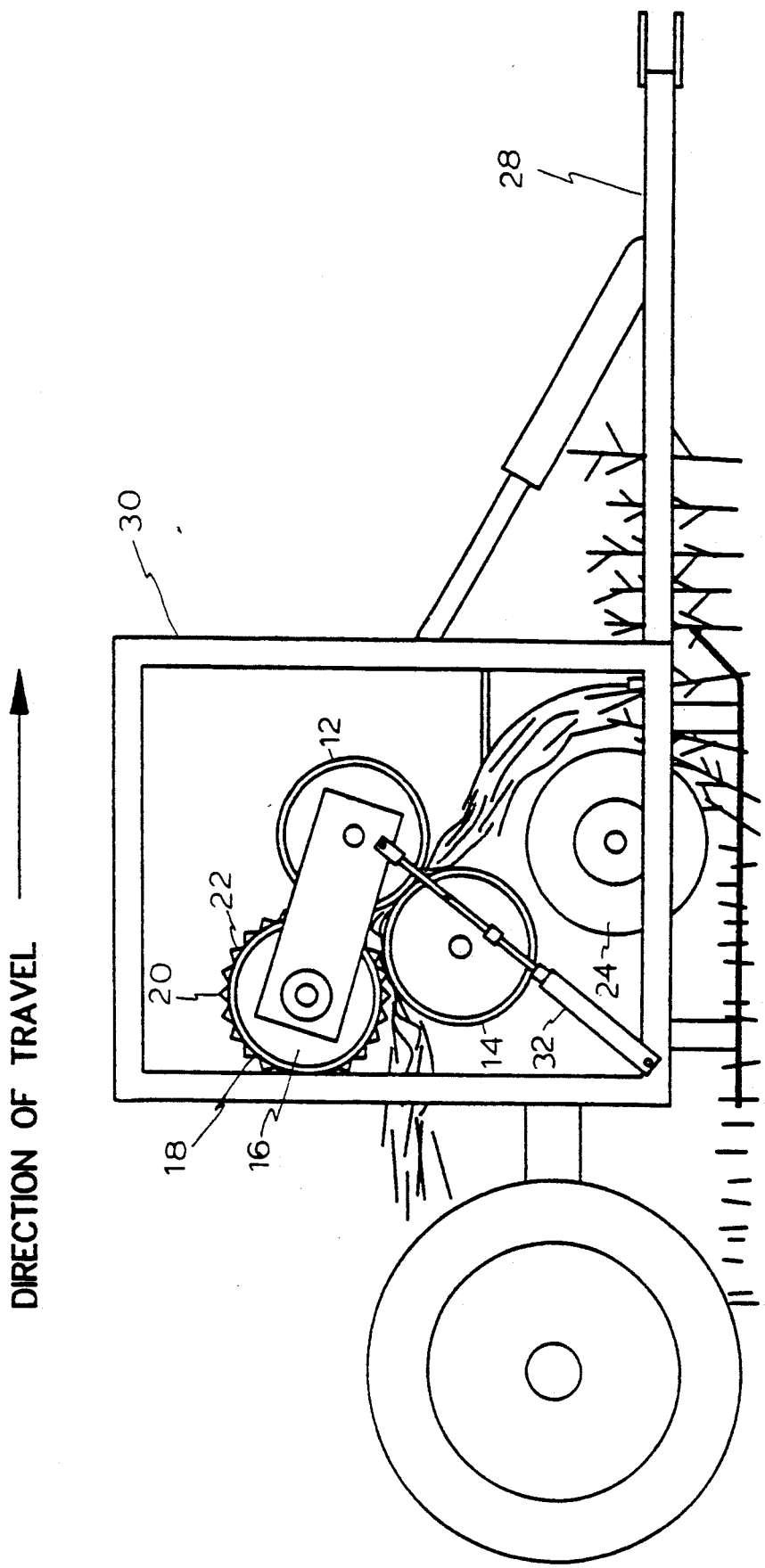
FIG. 1 is a side view of a first embodiment of the invention.

Referring now to FIG. 1, the apparatus 10 includes first and second rotatable crushing rollers 12 and 14, having outer generally cylindrical surfaces. The rollers are positioned with the axes thereof approximately parallel to one another, and with their outer surfaces adjacent or contiguous, either in contacting or closely spaced relationship. The rollers are adapted or constructed to rotate in opposite directions to promote passage and flow of the forage material therebetween for crushing, with, for example, upper roller 12 rotating clockwise, and lower roller 14 rotating counterclockwise.

Following passage between the crushing rollers 12 and 14, the crushed forage material is directed to contact rotatable impact rotor 16. Impact rotor 16 includes a central axle, drum or cylinder 18 having a plurality of outwardly extending projections 20 which are adapted or constructed to macerate the forage material without substantially shearing the same. The impact rotor 16 is positioned rearward of the crushing rollers 12 and 14 and at least partially in the path of the forage material exiting between the crushing rollers such that the material is contacted by the projections 20. The resultant product consisting of macerated forage material may then be discharged from the apparatus, or formed into a mat if desired, and deposited upon the ground.

Optionally, mat-forming means (not shown), positioned rearward or after the impact rotor, may be provided to receive the macerated forage material and form it into a mat. Suitable mat-forming means include but are not limited to pairs of pressing cylindrical rollers and/or belts, such as those described by Krutz [U.S. Pat. No. 4,265,076, the contents of which are herein incorporated by reference]. The practitioner skilled in the art will recognize that the mat-forming means may be included as a component of the instant apparatus, or alternatively, may be separately provided. Optional conveyor means or chute means (not shown) positioned after the impact rotor and/or mat-forming means, may also be provided to receive the treated forage material and lay it on the ground.

While the apparatus of this invention may be used for the treatment of forage material which has been previously cut, the apparatus is preferably provided with a mowing means 24, positioned ahead of the crushing rollers 12 and 14, to allow simultaneous mowing and treatment by a single unit. However, if the mowing means is separately provided, the practitioner skilled in the art will recognize that the crushing and maceration of the previously cut forage material with the instant apparatus should commence shortly after mowing. Prolonged delays between treatment and mowing may result in increased power demands for the treatment and lower degrees of maceration in the product. Suitable mowing means include but are not limited to horizontal rotary disc mowers, sickle-bar mowers, and especially flail-type mowers. Flail-type mowers provide the advantage of feeding the cut forage material directly and uniformly between the crushing rollers. However, because the kinetic energy imparted to the forage material is used to feed it to the crushing rollers, the surface speed of the crushing rollers should be compatible with the tip speed of the mower's rotor to prevent any forage material from falling back to the ground. Conveyor means 26 (FIG. 2) may be optionally provided between the mowing means and the crushing rollers to transport the cut forage therebetween. Such conveyor means are particularly indicated when using non-flail-type mowers, or when treating previously cut forage.

The apparatus is constructed as a field-going machine including a ground-traversing carriage 28 and frame 30, for carrying all of the above-mentioned rollers, rotor, mowing means, mat-forming means, and conveyors, as well as a means for providing power (not shown) to drive each of these components. As shown in FIG. 1, the carriage may be attached to any existing field-going machine, such as a tractor, with a hitching means. In this embodiment, the means for providing power may include a suitable power take-off mechanism for connection to the tractor as is conventional in the art, or a self-contained power source such as a diesel or gasoline engine. In the alternative, the apparatus may be constructed as part of a self-propelled machine having its own power source or engine. In either event, the practitioner skilled in the art will recognize that the means for providing power should include suitable drive belts, gears, or other conventional drive mechanisms for connection between the power source and the moving components.

The outer surfaces of the crushing rollers 12 and 14 may be independently smooth or knurled or serrated. However, improved material flow and crushing is obtained when using an upper crushing roller 12 with a knurled or serrated surface, and a lower crushing roller 14 with a relatively smooth surface. This combination facilitates release of the crushed material from the crushing rollers and ready flow to the impact rotor 16. In contrast, use of crushing rollers which both have knurled surfaces may result in a portion of the material adhering onto bottom roller 14 and fouling operation, while use of crushing rollers which are both smooth may yield lower material flow rates therebetween, and may also provide a lower degree of maceration.

The crushing rollers 12 and 14 may be positioned a fixed, predetermined small distance between their outer surfaces, which distance does not vary during use. For example, the outer surfaces of the rollers may be spaced from about 0.0 to about 0.2 inches apart, depending upon the degree of crushing desired and the amount of forage material treated. However, in the preferred embodiment, the crushing rollers are forced toward one another by appropriate force application means 32 in order to more effectively crush varying feed rates of the forage material as it passes therebetween. Use of such force application means also provides the advantage of controlling or varying the pressure applied in accordance with the desired degree of crushing. Suitable force application means should be capable of applying sufficient pressure to provide an effective degree of crushing or maceration of the forage material. An "effective degree" of crushing or maceration is defined herein as a degree of crushing or maceration which is substantially greater than control (untreated) forage material. Without being limited thereto, preferred force application means should be capable of applying a force of between about 1,000 and 20,000 N/m, and especially between about 5,000 and 7,500 N/m of roller length.

As shown, the force application means may include pairs of hydraulic cylinders (only one shown), connected to the ends of either one or both of the crushing rollers. However, the practitioner skilled in the art will recognize that other force application means can be used, including but not limited to gravitational force in conjunction with linkages, springs, pneumatic cylinders, pulleys, or belts. The force between the crushing rollers may be maintained approximately constant by means of an optional accumulator. Mechanical stops may also be installed to prevent the crushing rollers from being loaded against each other during interruptions in material flow.

With respect to the impact rotor 16, suitable projections 20 may take a variety of shapes, including but not limited to planar (FIG. 2) or curved fins (having a convex leading edge) attached at one edge to the cylinder 18, or angles (FIG. 1) attached at one or both edges to the cylinder 18, or polygonal structures such as triangles attached on one side to the cylinder. Regardless of the shape of projection selected, each projection will include an outwardly extending surface 22 (on the lead edge or side of the projection facing rotation) for striking the forage material exiting the crushing rollers 12 and 14. Optionally, in accordance with the preferred embodiment, at least the outer portion of each outwardly extending surface 22 is at an angle greater than 0° but less than 90°, and especially between about 10° to about 80°, to the radii of the cylinder 18, and is also angled away from the direction of rotation of the impact rotor. Construction in this manner minimizes the shearing of the forage material while effectively macerating the material.

The number, spacing, and size of the projections, the clearance between the impact rotor and crushing rollers, and the speed of rotation of the impact rotor are variable, but are also selected to provide an effective degree of maceration of the forage material. As above, an "effective degree" is defined herein as that amount of maceration which is substantially greater than that obtained from control forage material (in this case, forage which is only crushed but not impacted). Without being limited thereto, impact rotor tip speeds (the outermost edge of each outwardly extending surface 22) of between about 3,000 and 15,000 ft/min, and especially between about 5,000 and 10,000, are preferred. The number of projections is chosen to impact the material at theoretical intervals ranging from about $\frac{1}{2}$ to $2\frac{1}{2}$ in., preferably at intervals of about 1 in. to 2 in.

Figure 2:
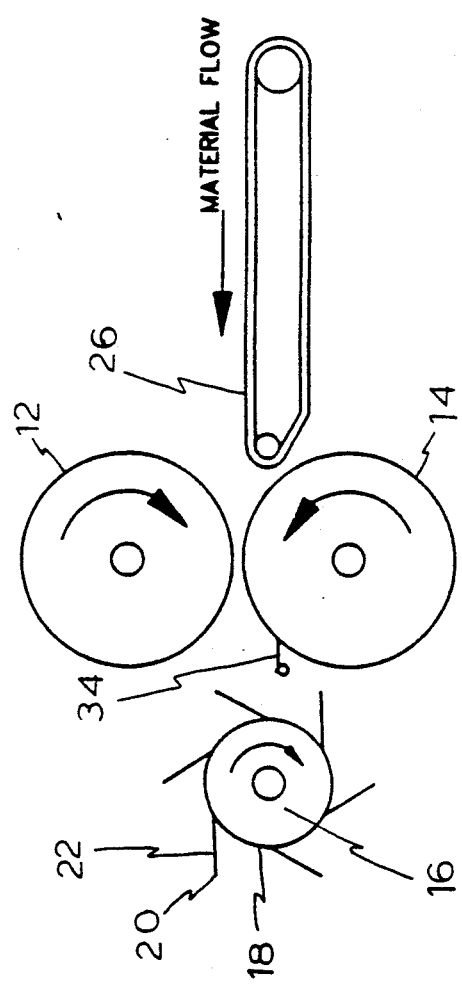
FIG. 2 is a side view of an alternative embodiment of the invention.

In an alternative embodiment, shown in FIG. 2, an impact support 34 may optionally be provided between the crushing rollers 12 and 14 and impact rotor 16. The impact support functions to support forage material exiting the crushing rollers while it is impacted by the projections 20 and bent over the edge of the support. Use of a rounded edge of the support minimizes shearing upon this impact.

The components of the device, including the crushing rollers and the impact rotor and its projections, should be constructed from a relatively rigid or stiff material to ensure maceration. Practically, iron, steel, or other metals are preferred, although other materials could be employed.

EXAMPLE 1

A small-scale apparatus was constructed for laboratory testing to determine the effects of crushing roller pressure and speed and impact rotor speed. The apparatus included a feed conveyor, two crushing rollers, an impact support, and an impact rotor as shown in FIG. 2. The crushing rollers were both made of steel cylinders, 22.5 cm. in diameter, 75 cm. long, and with the top roller having a coin-knurled surface and the bottom roller having a smooth surface. The force between the crushing rollers was applied by two hydraulic cylinders whose pressure was maintained approximately constant by an accumulator. The impact rotor was also 75 cm. long and 22.5 cm. in diameter, with six equally spaced 5 cm. wide steel fins welded at 45° angles to the cylinder radii. The impact support had a rounded edge of 1.3 cm. radius, while the feed conveyor was 50 cm. wide and had a 12 m long elevator.

A $2^3$ factorial design was conducted using 8 kg of freshly cut alfalfa for each treatment. The alfalfa was spread uniformly over the elevator to provide a uniform flow of the material of 400 kg/m$^2$-hr. The impact rotor speed was varied between 3000 and 4000 rpm; the crushing roller hydraulic cylinder pressure varied between 2068 and 4137 kPa (3210 and 5780N/m of roller length); and both crushing rollers were driven at the same speed between 600 and 800 rpm. A Surface Area Index (SAI) was used to quantify the effectiveness of each treatment. The SAI is a rate of moisture absorption test that has been used to quantify the degree of maceration of the plant material and has been directly correlated to the drying rate and relative strength of the macerated forage mats [Shinners et al., Transactions of ASAE, vol. 30, no. 1 (1987), pp. 23–27, the contents of which are herein incorporated by reference]. The results are shown in Table I hereinbelow.

TABLE I

Surface Area Index (SAI) Values Due to the Effects of Impact Rotor Speed, Crushing Roll Pressure, and Crushing Roll Speed

| Experimental Conditions | | | |
|---|---|---|---|
| Impact Rotor | Crushing Rolls | | |
| Speed (RPM) | Pressure (kPa) | Speed (RPM) | Surface Area Index |
| 3000 | 2068 | 600 | 1.36 |
| 3000 | 2068 | 800 | 1.30 |
| 3000 | 4137 | 600 | 1.33 |
| 3000 | 4137 | 800 | 1.34 |
| 4000 | 2068 | 600 | 1.36 |
| 4000 | 2068 | 800 | 1.38 |
| 4000 | 4137 | 600 | 1.42 |
| 4000 | 4137 | 800 | 1.43 |

Based upon experience, it is believed that an SAI of about 1.4 is preferred from the standpoint of enhanced drying rates and mat formation of lucerne.

EXAMPLE 2

A second experiment was conducted to determine the effects of the forage material feed rate. The procedure of Example 1 was repeated with the impact rotor speed and the crushing roller speed and pressure being held constant at the previous maximum levels. Three trials were conducted using 8, 16, and 32 kg of freshly cut alfalfa feed spread over the elevator, providing a feed density of 400, 800, and 1600 kg/m$^2$-hr. The results are shown in Table II.

TABLE II

Effects of Material Thickness on Degree of Maceration

| Material Density (kg/m$^2$-hr) | Surface Area Index |
|---|---|
| (400) | 1.43 |
| (800) | 1.45 |
| (1600) | 1.35 |

The results show very little change in SAI values for the first two values but a decrease in the degree of maceration for the larger feed rate. The results would appear to indicate that the rate of material feed expressed in kg/m$^2$-hr should be controlled to provide for optimum maceration.

EXAMPLE 3

A 150 cm wide field-going prototype of the apparatus shown in FIG. 1 was constructed to determine suitable field speeds and energy requirements. The unit consisted of a flail-type mower, a pair of steel crushing rollers with the top roller having a coin-knurled surface and the bottom roller having a smooth surface, and hydraulic cylinders for applying crushing pressure as in Example 1. The impact rotor was constructed with 24 removable projections made of 2.5×2.5 cm. angle iron.

Tests in mature first crop alfalfa demonstrated successful maceration at field speeds of 8 km/hr, with a specific energy requirement of 2.1 kw-hr/kton.

It is understood that the foregoing detailed description is given merely by way of illustration and that modifications and variations may be made therein without departing from the spirit and scope of the invention.

We claim:

1. An apparatus for treating forage material comprising:
   (a) a first rotatable crushing roller having an outer generally cylindrical surface;
   (b) a second rotatable crushing roller having an outer generally cylindrical surface and positioned approximately parallel to said first roller, said first and second rollers adapted to rotate in opposite directions effective to form crushed forage material when forage material is passed between said rollers while rotating; and
   (c) a rotatable impact rotor having a plurality of outwardly extending projections, said projections being adapted to effectively macerate said crushed forage material by splitting in a longitudinal direction without substantially shearing said crushed forage material, and wherein said impact rotor is positioned rearward of said first and second crusher rollers so as to impact and macerate said crushed forage material that has passed between said crushing rollers.

2. An apparatus as described in claim 1 further comprising a mower positioned forward of said first and second crushing rollers, for mowing forage material for transport to said first and second crushing rollers.

3. An apparatus as described in claim 1 wherein said apparatus does not include any crushing rollers in combination with one or more finned rotors positioned rearward of said impact rotor which are effective for crushing and macerating forage material that has impacted said impact rotor.

4. An apparatus as described in claim 1 further comprising means for applying force to at least one of said first and second crushing rollers in a direction toward the other of said first and second crushing rollers.

5. An apparatus as described in claim 1 wherein said impact rotor is adapted to impact said crushed forage material at intervals of between about ½-in. to 2 ½ in. and to achieve tip speeds of said projections between about 3,000 and 15,000 feet/minute.

6. An apparatus as described in claim 1 further comprising an impact support positioned intermediate said crushing rollers and said impact rotor for supporting said crushed forage material that has passed between said first and second crushing rollers as it is impacted by said impact rotor.

7. A method for treating forage material comprising:
   (a) providing an apparatus comprising:
      (1) a first rotatable crushing roller having an outer generally cylindrical surface;
      (2) a second rotatable crushing roller having an outer generally cylindrical surface and positioned approximately parallel to said first roller, said first and second rollers adapted to rotate in opposite directions effective to form crushed forage material when forage material is passed between said rollers while rotating; and
      (3) a rotatable impact rotor having a plurality of outwardly extending projections, said projections being adapted to effectively macerate said crushed forage material by splitting in a longitudinal direction without substantially shearing said crushed forage material, and wherein said impact rotor is positioned rearward of said first and second crusher rollers so as to impact and macerate said crushed forage material that has passed between said crushing rollers;

(b) passing said forage material between said first and second crushing rollers to form crushed forage material, and (c) impacting said crushed forage material upon said impact rotor to macerate said crushed forage material by splitting in a longitudinal direction.

8. A method as described in claim 7, wherein said forage material is alfalfa.

9. An apparatus as described in claim 1 wherein said apparatus does not include a second rotatable impact rotor having a plurality of projections paired with said impact rotor of (c).

10. A method as described in claim 7 wherein said apparatus does not include a second rotatable impact rotor having a plurality of projections paired with said impact rotor of (a) (3).

11. A method as described in claim 7 wherein said impact rotor is adapted to to impact said crushed forage material at intervals of between about ½-in. to 2 ½ in. and to achieve tip speeds of said projections between about 3,000 and 15,000 feet/minute.

* * * * *